(12) United States Patent
Stankowski et al.

(10) Patent No.: US 12,447,444 B2
(45) Date of Patent: Oct. 21, 2025

(54) BIOCOMPATIBLE POLYMERIC FILTRATION MEMBRANE WITH PORES DEFINED BY UNIFORM PASSAGES

(71) Applicant: Global Life Sciences Solutions USA LLC, Marlborough, MA (US)

(72) Inventors: Ralph Stankowski, Westborough, MA (US); Douglas Albagli, Clifton Park, NY (US); William A. Hennessy, Schenectady, NY (US)

(73) Assignee: Global Life Sciences Solutions USA LLC, Marlborough, MA (US)

( * ) Notice: Subject to any disclaimer, the term of this patent is extended or adjusted under 35 U.S.C. 154(b) by 0 days.

(21) Appl. No.: 18/494,333

(22) Filed: Oct. 25, 2023

(65) Prior Publication Data

US 2024/0050905 A1 Feb. 15, 2024

Related U.S. Application Data

(62) Division of application No. 17/067,528, filed on Oct. 9, 2020, now Pat. No. 11,833,477.

(51) Int. Cl.
| | |
|---|---|
| *B01D 71/06* | (2006.01) |
| *B01D 67/00* | (2006.01) |
| *B01D 69/02* | (2006.01) |

(52) U.S. Cl.
CPC ......... *B01D 71/06* (2013.01); *B01D 67/0037* (2013.01); *B01D 69/02* (2013.01); *B01D 2325/04* (2013.01)

(58) Field of Classification Search
None
See application file for complete search history.

(56) References Cited

U.S. PATENT DOCUMENTS

| | | | |
|---|---|---|---|
| 5,651,900 | A | 7/1997 | Keller et al. |
| 5,770,076 | A | 6/1998 | Chu et al. |
| 5,948,255 | A | 9/1999 | Keller et al. |
| 7,784,619 | B2 | 8/2010 | Jacobson |

(Continued)

FOREIGN PATENT DOCUMENTS

| | | |
|---|---|---|
| JP | H09511439 A | 11/1997 |
| JP | H09512250 A | 12/1997 |

(Continued)

OTHER PUBLICATIONS

Search Report received in International Application No. PCT/EP2021/077435 dated Dec. 7, 2021, 5 pages.

(Continued)

*Primary Examiner* — Ryan B Huang
(74) *Attorney, Agent, or Firm* — Jeff B. Vockrodt; CM Law

(57) ABSTRACT

A biocompatible polymeric membrane includes pores defined between two material layers, where the first membrane material layer includes strips, and the second membrane material binds to each of the plurality of first membrane material layer strips includes a plurality of windows exposing each of the first membrane material strips. The biocompatible polymeric filtration membrane comprises pores defined by uniform passages defined by the first membrane material layer strips and the second membrane material layer within each window.

11 Claims, 12 Drawing Sheets

(56) References Cited

U.S. PATENT DOCUMENTS

| | | | |
|---|---|---|---|
| 8,815,092 | B2 | 8/2014 | Zheng et al. |
| 2005/0263452 | A1* | 12/2005 | Jacobson ........... B01D 67/0034 264/494 |
| 2012/0183946 | A1 | 7/2012 | Tang et al. |
| 2015/0076049 | A1 | 3/2015 | Arya et al. |
| 2021/0121618 | A1 | 4/2021 | Kant et al. |

FOREIGN PATENT DOCUMENTS

| | | |
|---|---|---|
| JP | H11506696 A | 6/1999 |
| JP | 2003526497 A | 9/2003 |
| JP | 2011510656 A | 4/2011 |
| JP | 2015521103 A | 7/2015 |
| WO | 9524472 A1 | 9/1995 |
| WO | 0141905 A1 | 6/2001 |
| WO | 2013173631 A2 | 11/2013 |
| WO | 2016100136 A1 | 6/2016 |

OTHER PUBLICATIONS

Written Opinion received in International Application No. PCT/EP2021/077435 dated Dec. 7, 2021, 9 pages.
Office Action received in Japanese Application No. 2023-521656 dated Jun. 3, 2025, with translation, 17 pages.

* cited by examiner

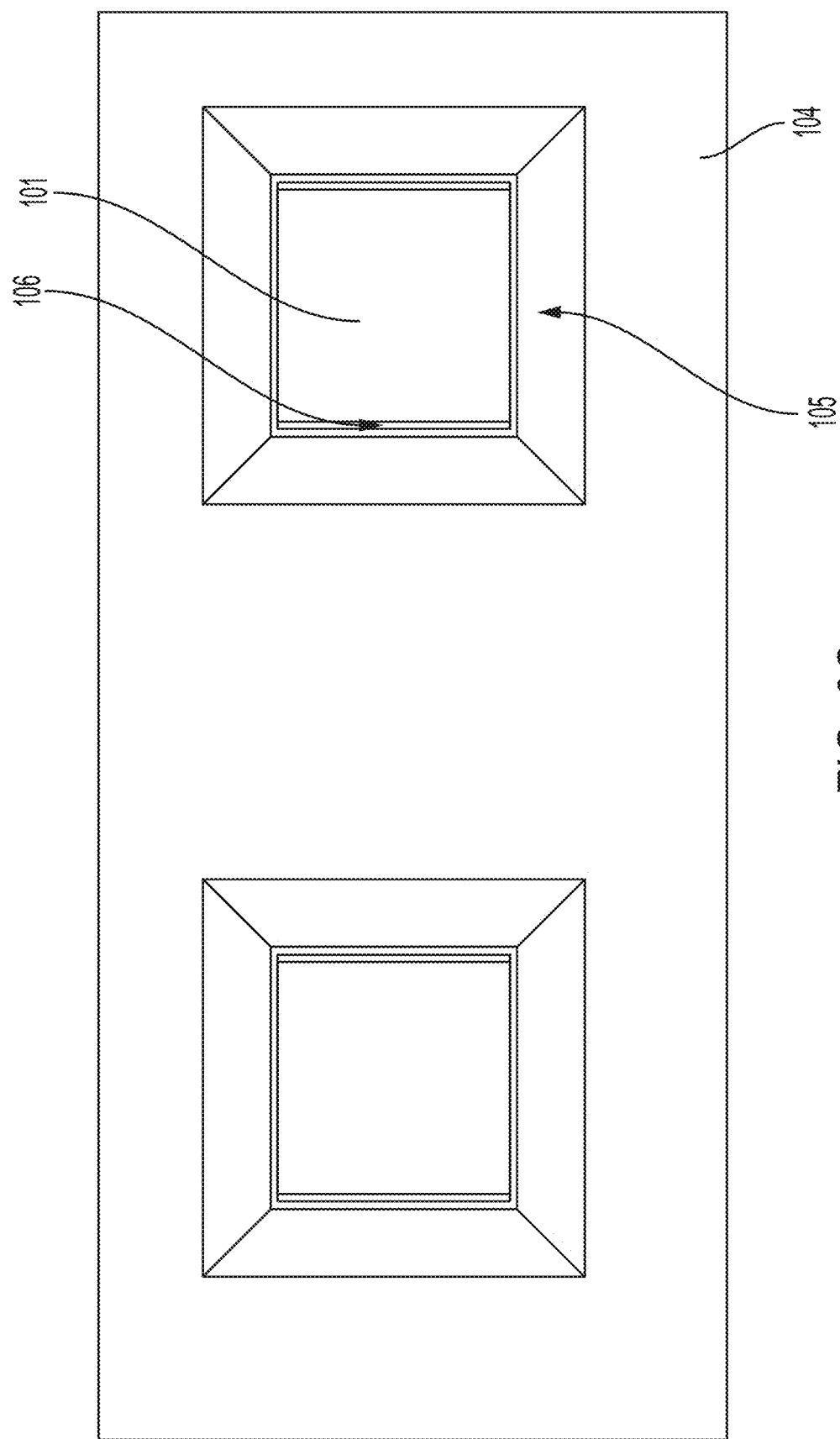

BIOCOMPATIBLE POLYMERIC FILTRATION MEMBRANE WITH PORES DEFINED BY UNIFORM PASSAGES

BACKGROUND

Tangential flow filtration is widely used in bioprocess technology to remove liquid from a mixture of particulate and liquid, and can be used, for example, to concentrate cells or remove liquid from a mixture of liquid and cells, cellular debris, or other particulate matter. Tangential Flow devices are complicated three-dimensional devices that are fundamentally different compared to normal flow (dead ended) devices. The Hollow Fiber devices and most tangential flow devices have very small pores that foul easily. A dead ended device with very small pores would foul nearly instantly with many large solids that are bigger than the pores. Tangential flow devices recirculate the "Feed" in a loop. The "Permeate" typically has a much lower flow rate so the larger suspended solids continue in the direction of the "Retentate" direction. If the retentate is recycled to the feed tank the process is a batch process, and if the retentate is withdrawn and not recycled it is a single-pass tangential flow process as shown in FIG. 1A.

One type of tangential flow filtration device is called a hollow fiber membrane device and is shown in FIGS. 1B-C. The hollow fibers are packed into a tube ("potted") so that the feed is pumped through the hollow fibers, and the permeate is collected outside of the fibers within the tube. FIG. 1B shows the exposed ends of the fibers as they appear at the end of the tube. FIG. 1C shows the several tubes that house hollow fiber membranes. Hollow fiber devices have several shortcomings. The pore size of the membranes themselves are a function of the extrusion process and material characteristics of the fibers themselves, and can only be controlled to produce a range of pore sizes. In addition, because of variability in the somewhat manual process of embedding hollow fibers into a tube, there is variability in the effectiveness of each device, which can make process design more difficult.

Another type of tangential flow device is a stacked plate device, which uses a flat membrane stacked between plates as shown in FIGS. 1D-E. The porosity of the flat plate devices similar to the hollow fiber devices typically depends on the process for making the membrane and often results in a range of pore sizes due to variability in the process for making the pores. Moreover, the processes for making flat membranes can limit the size of available pores.

Microfabricated particulate filters are described in U.S. Pat. No. 5,651,900, entitled "Microfabricated Particle Filter." The processes disclosed in the '900 patent allow for making a pore size that is determined by the thickness of a layer of deposited material. These devices, however, utilize standard microprocessor technology to produce particulate filters that are made from semiconductor materials such as silicon, and silicon dioxide. The '900 patent discloses an embodiment using polyimide matrix to hold "islands" with pores produced using traditional semiconductor construction methods utilizing silicon and silicon dioxide. These filters have not been adopted in the bioprocess industry as they include rigid components and rely on complicated manufacturing processes. These components are brittle and cannot withstand typical conditions required for membrane filters. Moreover, the polyimide matrix is used with pores that include horizontal passages that can become deformed upon application of pressure to the membrane.

The present inventors have perceived a need for biocompatible particulate filters having a uniform pore size distribution would be particularly desirable for tangential flow filtration applications.

SUMMARY

In one aspect, the invention involves a biocompatible polymeric filtration membrane comprising: a plurality of first membrane material layer strips; a second membrane material binding to each of the plurality of first membrane material layer strips, the second membrane material comprising a plurality of windows exposing each of the first membrane material strips, wherein the biocompatible polymeric filtration membrane comprises pores defined by uniform passages defined by the first membrane material layer strips and the second membrane material layer within each window. The first and second membrane materials may comprise polyimide. The pores may have a thickness of 20 to 1000 nm, and the membrane may have a thickness in the range of 2-10 microns. In one aspect, the membrane may have a thickness of 2-10 microns, the first membrane has a thickness in the range of 1 to 5 microns, and the second membrane layer has a thickness in the range of 2.5 to 20 microns.

In another aspect, the invention involves a method of making a biocompatible polymeric filtration membrane comprising the steps of: (a) depositing a first membrane material layer on a substrate; (b) patterning the first membrane material layer into a plurality of strips; (c) depositing a pore-defining sacrificial layer on the first membrane material strips; (d) patterning the pore-defining sacrificial layer into strips orthogonal the first membrane material strips; (e) depositing a second membrane material layer over the substrate; (f) etching a window in the second membrane material layer to expose the pore-defining sacrificial layer; (g) selectively etching the pore-defining sacrificial layer to create pores defined by uniform passages defined by the first membrane material layer strips and the second membrane material layer within each window.

In one aspect, step (b) of patterning the first membrane material layer comprises depositing a hardmask layer on the first membrane material layer. The step (f) of etching a window in the second membrane material layer to expose the pore-defining sacrificial layer comprises depositing a hardmask layer on the second membrane material layer. In one aspect, the first membrane material and second membrane material comprise polyimide. The pores in one aspect have a thickness of 20 to 1000 nm, and membrane has a thickness in the range of 2-10 microns. In another aspect, the membrane has a thickness of 2-10 microns, the first membrane has a thickness in the range of 1 to 5 microns, and the second membrane layer has a thickness in the range of 2.5 to 20 microns.

BRIEF DESCRIPTION OF THE DRAWINGS

FIG. 6C shows a top down view showing the slits in the membrane.

DETAILED DESCRIPTION

Figure 1A:
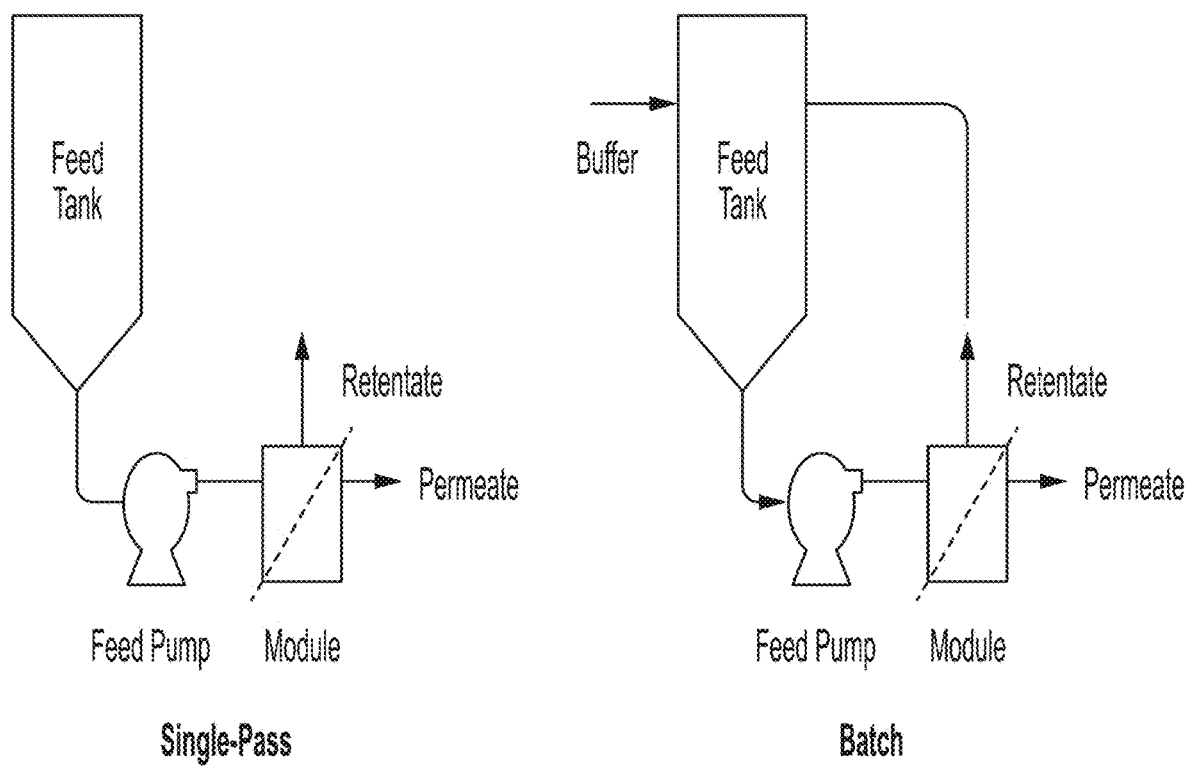
FIG. 1A shows prior art tangential flow single-pass and batch filtration processes.
Figure 1B:
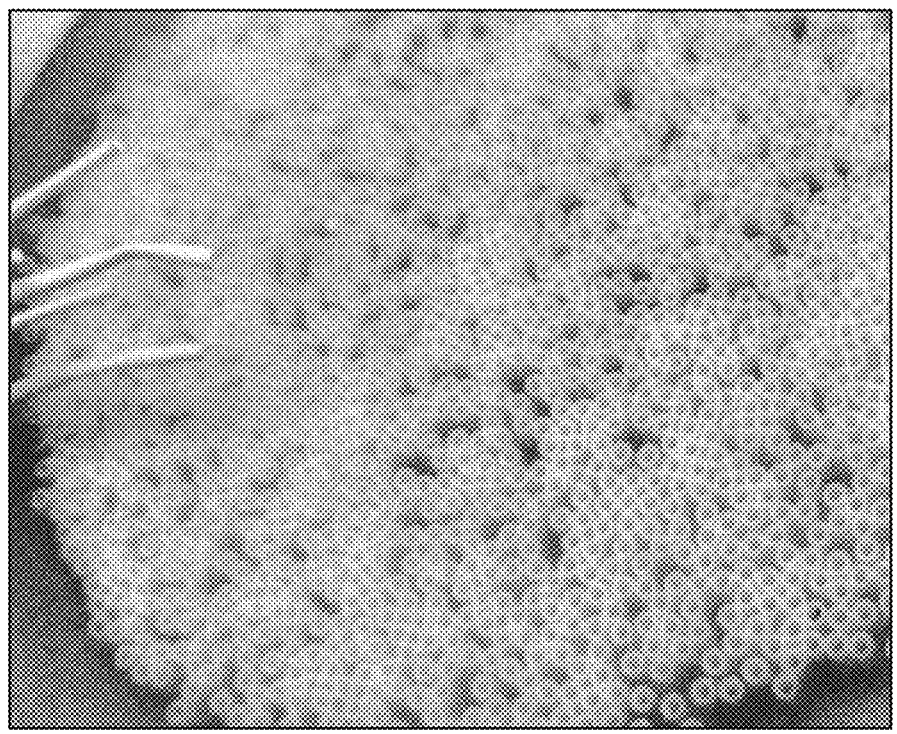
FIG. 1B shows the ends of a hollow fiber membrane tangential flow device.
Figure 1C:
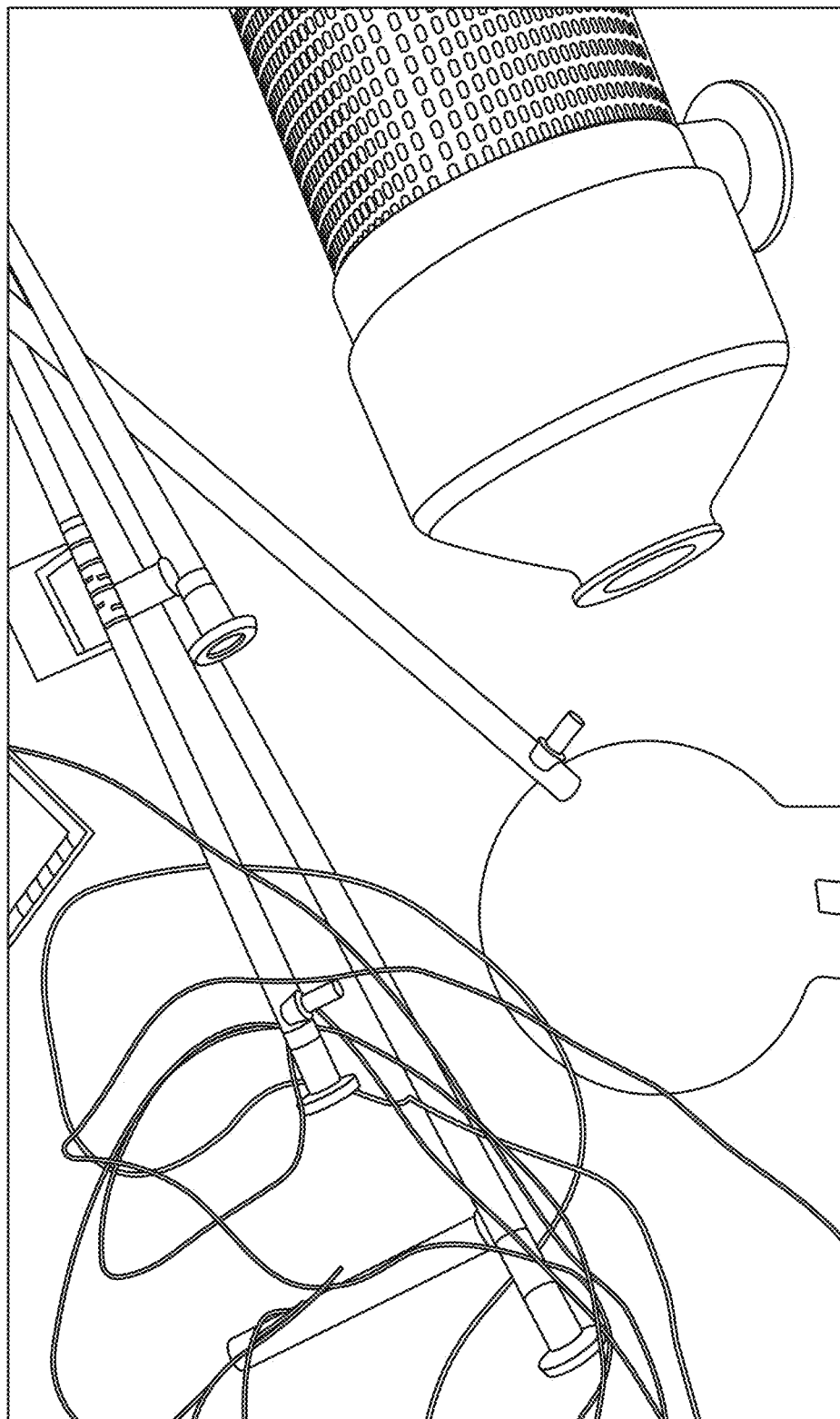
FIG. 1C shows the tubes used in hollow fiber membrane tangential flow devices, as well as a cross section of hollow fibers.
Figure 1D:
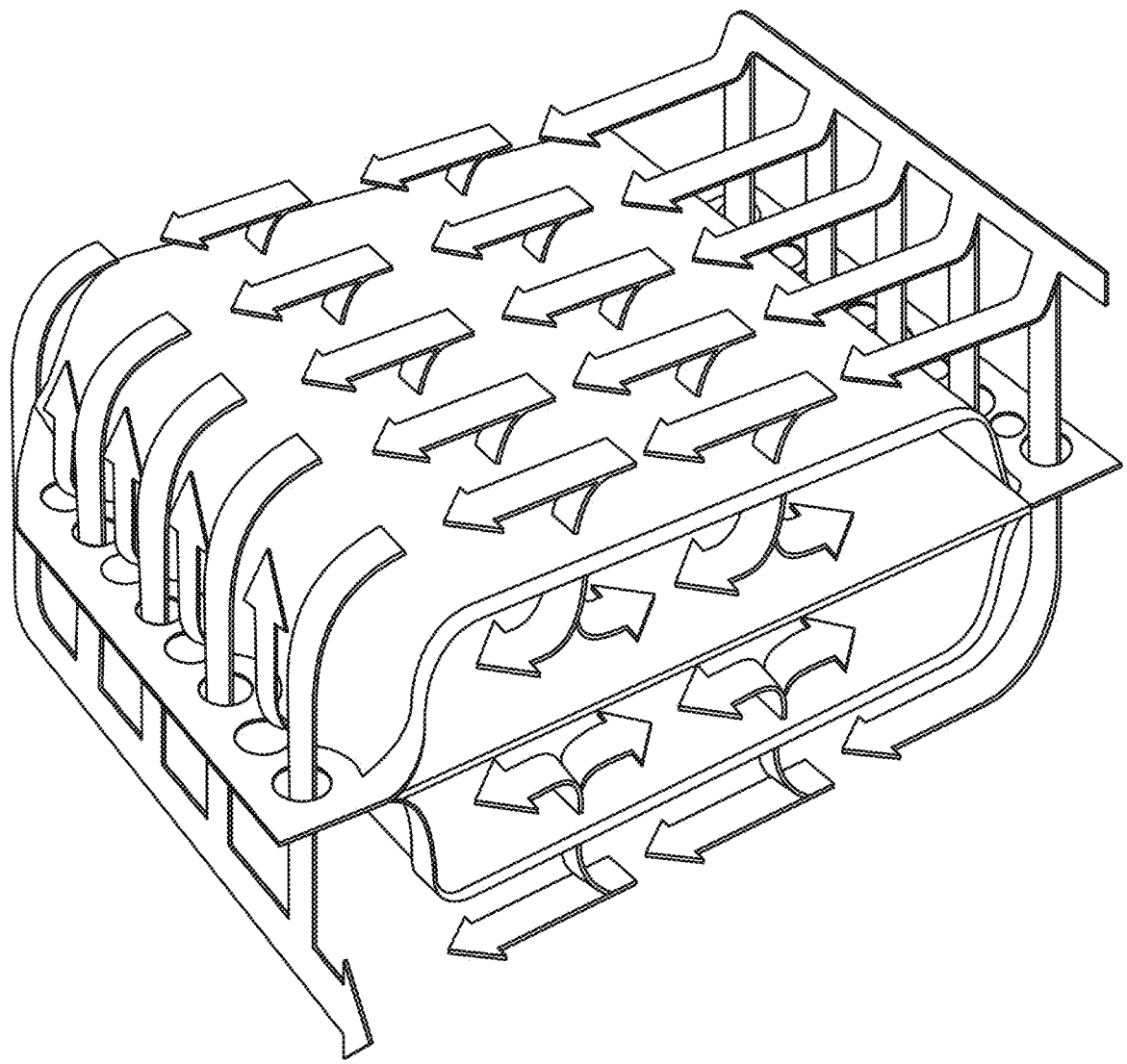
FIG. 1D shows a schematic of a stacked plate tangential flow device.
Figure 1E:
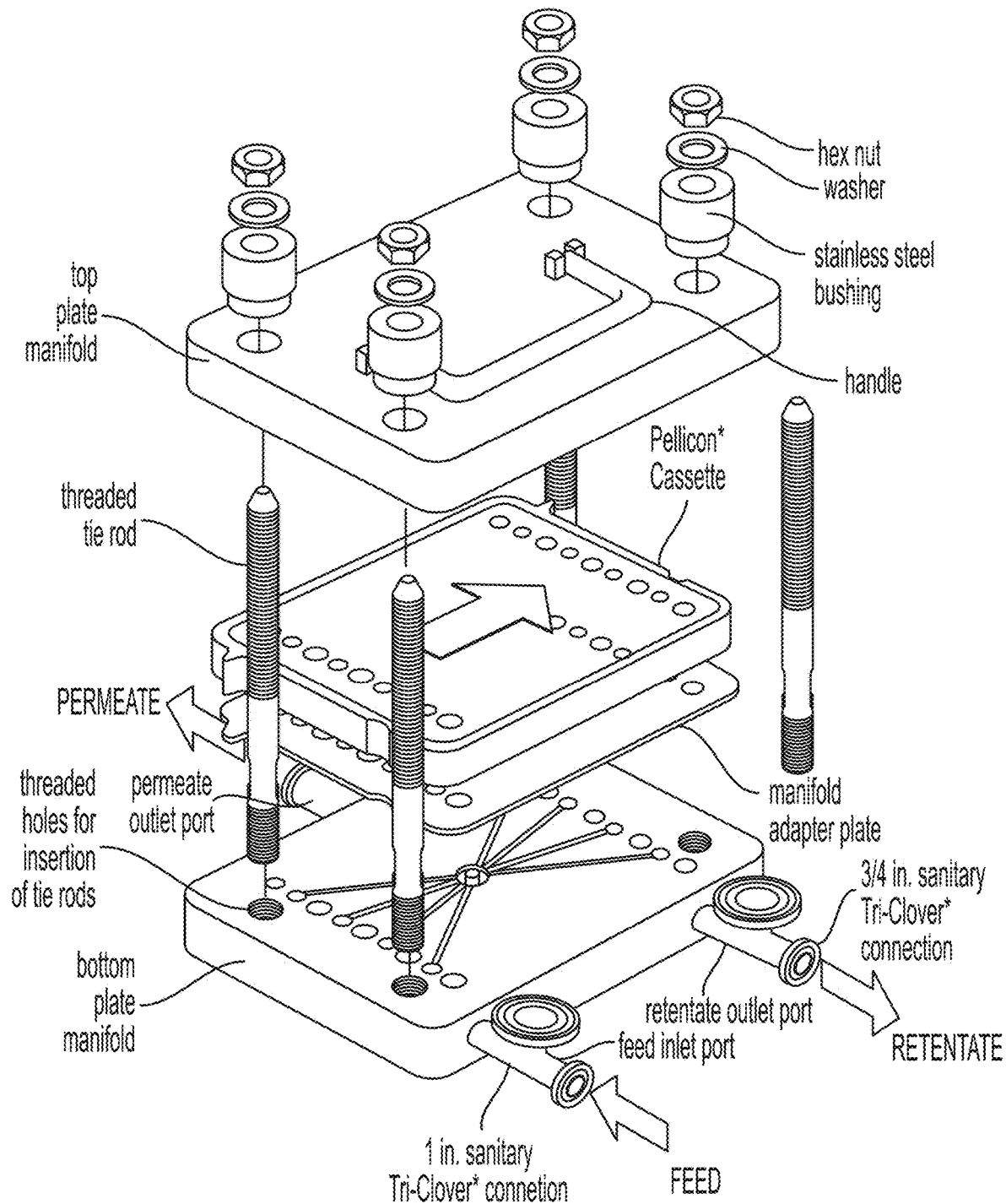
FIG. 1E shows the details of a conventional stacked plate tangential flow device.

Various implementations and details are described with reference to membranes disclosed herein, as well as methods of making and using these membranes. The membranes are made using a combination of photolithography and mask technology that has been specifically adapted for biocompatible materials. Such membranes may for example be constructed from a flexible (non-brittle), biocompatible material with vertically aligned pores that have a minimum pore dimension that is tightly controlled and uniform over the entire membrane.

The biocompatible membranes herein include pores that are defined within the membrane material using a sacrificial layer, wherein the thickness of the sacrificial layer defines the minimum pore dimension for the membrane. Because the thickness of a sacrificial layer can be tightly controlled over the entire surface of the membrane, the pore diameter can be tightly controlled over the membrane surface. The width of the sacrificial layer strip defines the length of the slot-shaped pore formed in the membrane when the sacrificial layer is removed. As the width of the sacrificial layer strip is lessened, the pore shape becomes closer to a square shaped pore. When the width of the sacrificial layer strip is equal to its height, a square shaped pore is produced in the membrane.

The pores formed in the membrane are preferably aligned in the material vertically with a line of sight that extends completely through the membrane. Because filtration includes a pressure differential through the membrane, it is important to not have pores that are not deformed into a closed position due to pressure exerted in a direction normal to the membrane surface. Also vertically oriented pores are more likely to resist clogging during use under tangential flow conditions. While this provides an advantage for tangential flow applications, the membrane filters described herein may be used in tangential flow filtration as well as dead end filtration applications.

In one aspect, the invention comprises a liquid-filtering porous membrane, the porous membrane comprising a polymeric membrane layer having a surface area greater than 300,000 $mm^2$ or more. The size of membrane is only limited by the size of the equipment used to manufacture the membrane. The membrane may be formed on a large substrate of 300,000 $mm^2$ or more and patterned into several smaller membranes using the lithography techniques described herein. The membrane has a thickness of 2 to 50 microns, preferably 5 to 25 microns, and more preferably from 5 to 15 microns. The membrane includes pores, the pores having a defined minimum pore dimension defined by the thickness of a sacrificial layer, wherein the minimum pore dimension 10 to 1000 nm, preferably 20 to 500 nm, and more preferably 30 to 130 nm. Because the minimum pore dimension is controlled by the thickness of a sacrificial layer that can be controlled to within +/−10 nm over the entire worksurface, the membrane minimum pore dimension has a standard deviation of less than 50 nm, preferably 20 nm or less, more preferably 10 nm or less, and most preferably 5 nm or less.

Figure 2A:
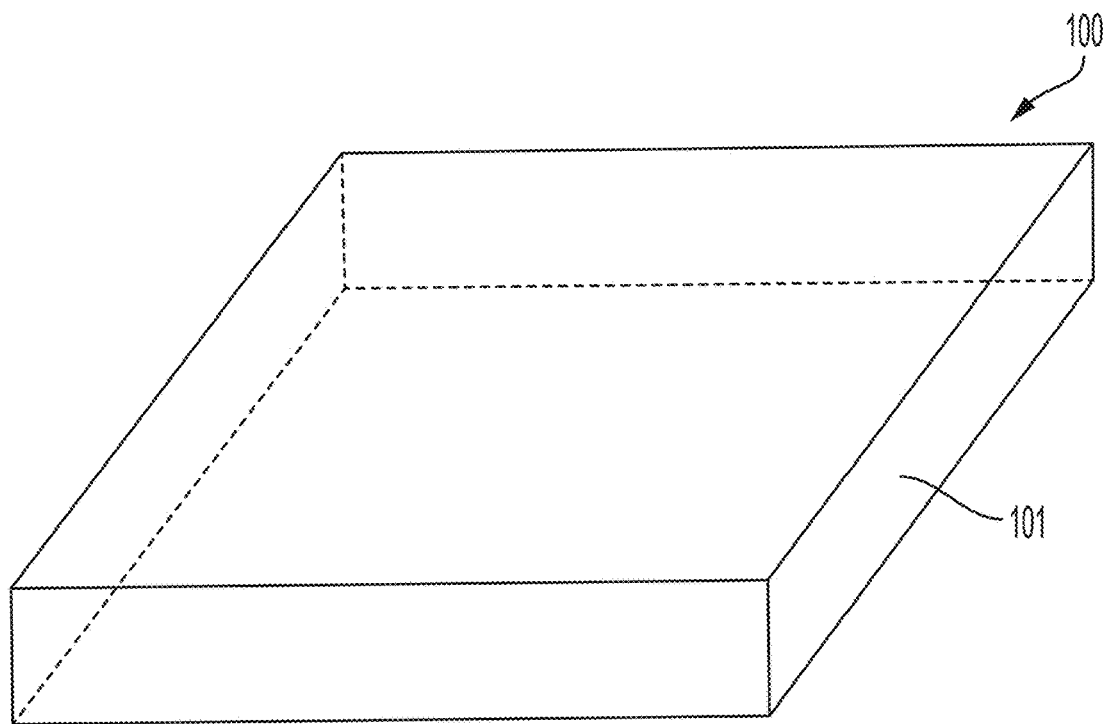
FIG. 2A shows a first layer of membrane material deposited on a substrate in the process of making a slotted biocompatible membrane.

In one example, the process for making the membrane begins with forming strips of first membrane material 101 as shown in FIG. 2A. Although not shown in FIG. 2A is should be understood that the first membrane material is provided on a substrate 100, although the substrate is not shown in FIG. 2A. The strips may be a biocompatible material that can be coated on the support substrate at controlled thickness, and should have a coefficient of thermal expansion (CTE) that matches the underlying substrate. One suitable material is polyimide (PI). This material is capable of being spun coated onto a support substrate. PI is available in several grades that have differing CTE, many of which differ from that of glass. In the case of a glass support substrate, the PI can be selected to have a CTE that is similar to glass. In addition, PI has the capability to withstand processing temperatures of up to 400° C. which may be necessary to make these components, and is well above the temperatures typically encountered in bioprocess filtering applications. The first membrane material may come supplied on a glass substrate, or it may be deposited onto a glass substrate using a coating process such as spin coating and curing. In some cases, it may be desirable to provide a release layer (not shown) between the glass substrate and the first membrane material.

After coating the substrate 100 with first membrane material, the material can be at least partially cured. In one aspect, the first membrane material is fully cured at this stage. However, partial curing at this step may be desirable to allow final curing to be completed at the same time the second membrane material is cured. Allowing some additional curing of the first membrane material during the final curing step can improve bonding of the first and second membrane materials.

Figure 2B:
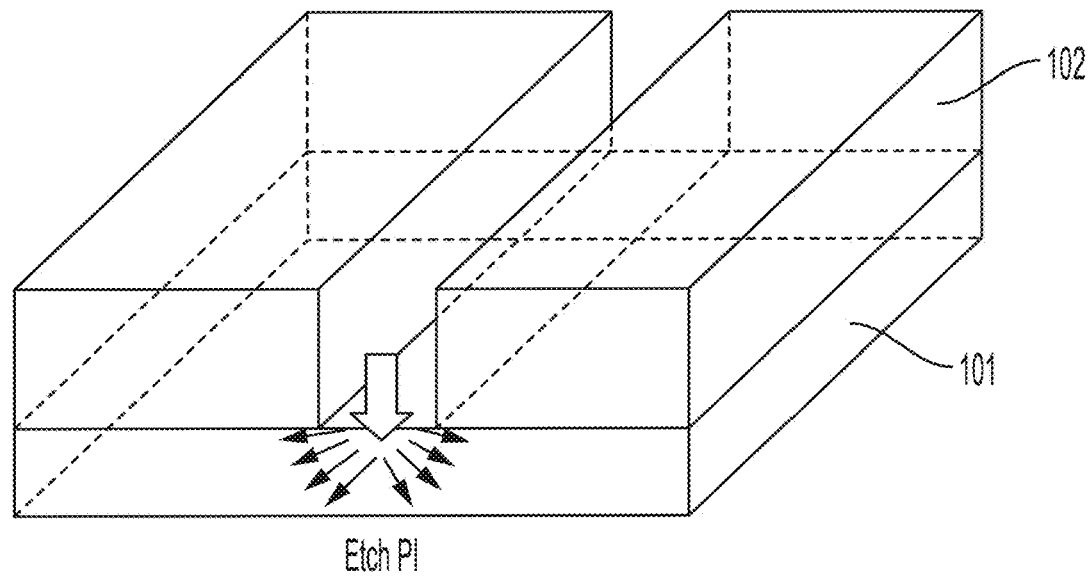
FIG. 2B shows patterning of a first layer of membrane material deposited on a substrate in the process of making a slotted biocompatible membrane.

The process of forming strips generally includes a pattern/etch/strip sequence. The pattern/etch/strip sequence starts with depositing photoresist 102 over the first membrane material. The photoresist material is then patterned into strips using photolithography followed by developing the photoresist. In the case of a positive photoresist, the light from the photolithography selectively exposes portions of the photoresist that are intended to be removed. This occurs because light makes a positive photoresist more soluble in the developer solution. Alternatively, exposure to light makes a negative photoresist polymerize thereby decreasing its solubility in developer solution. FIG. 2B shows the patterned photoresist layer 102 over the first membrane material layer 101.

Figure 2C:
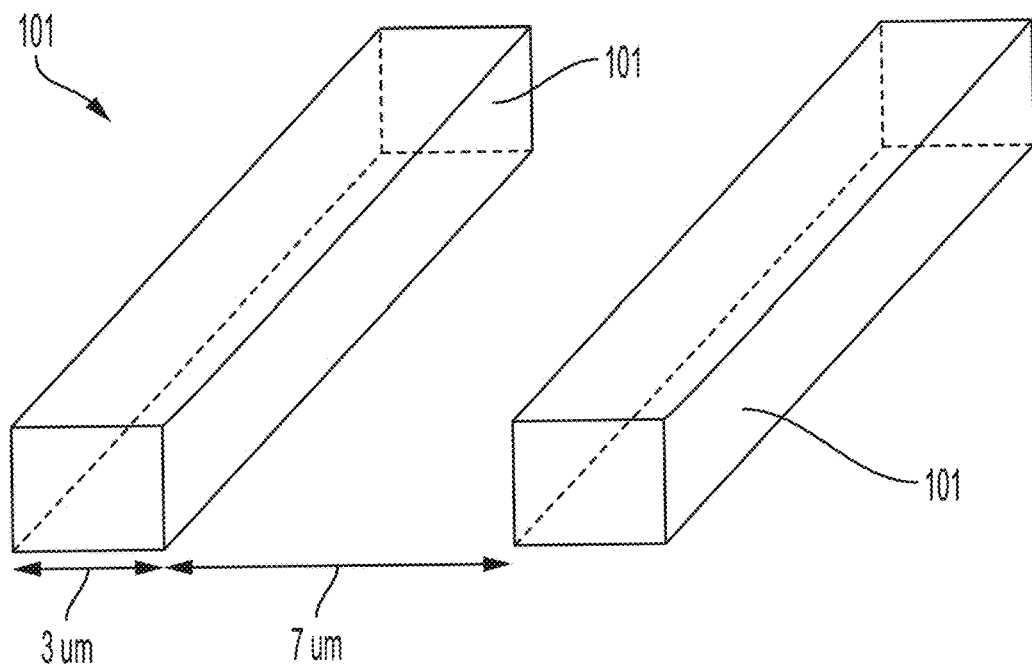
FIG. 2C shows a first layer of membrane material patterned into strips on a substrate in the process of making a slotted biocompatible membrane.
Figure 2D:
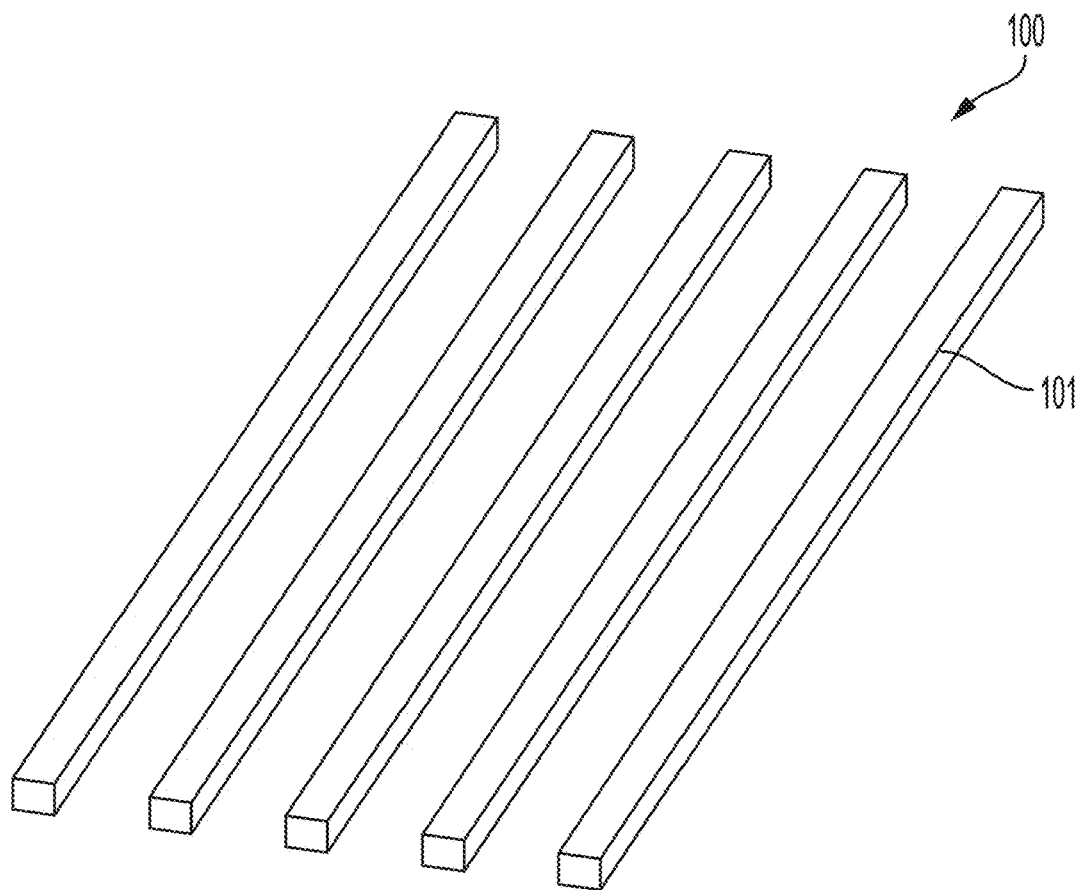
FIG. 2D shows another view of first layer of membrane material patterned into strips on a substrate in the process of making a slotted biocompatible membrane.

Next, the photoresist 102 and underlying first membrane material 101 exposed through the photoresist 102 are then etched until the part of the first membrane material exposed through the photoresist is completely removed. The resultant first material layer strips 101 are shown in FIGS. 2C-2D. Since PI is a similar polymer to the photoresist, both materials tend to etch at about the same rate. If the membrane material is thick relative to the photoresist, the etching could remove all the photoresist before the glass substrate is reached in the exposed portions. This case often is more likely to occur when the thickness of the first membrane material exceeds, for example, 2 microns.

In the case of a thicker first membrane material layer, it may be necessary to employ a pattern hardmask (not shown) over the first membrane material layer in the same pattern intended for the first membrane layer strips 101 to protect that material from the etch process. The pattern hardmask material may be amorphous silicon nitride, which is typically deposited by chemical vapor deposition from silane ($SiH_4$) and ammonia ($NH_3$). It is desirable that the hardmask material lack metals that may contaminate the membrane material. This can be important for membranes used in bioprocess where metallic contamination may preclude their use.

The process of patterning the first membrane material into strips using a pattern hardmask involves depositing a pattern hardmask over the first membrane material layer. Then photoresist is patterned over the pattern hardmask layer using photolithography and developing. The exposed parts of the pattern hardmask are etched away using a selective wet etch. Then the first membrane material exposed through the pattern hardmask/photoresist layer is etched. In this case, the pattern hardmask layer above the first membrane material that is intended to remain as strips protects it while the remaining exposed portions are etched down to the substrate. Then the pattern hardmask material above the first membrane layer strips 101 is removed using a selective wet etch. The selective wet etch for silicon nitride may be performed in buffered HF etch that is near room temperature.

Figure 3A:
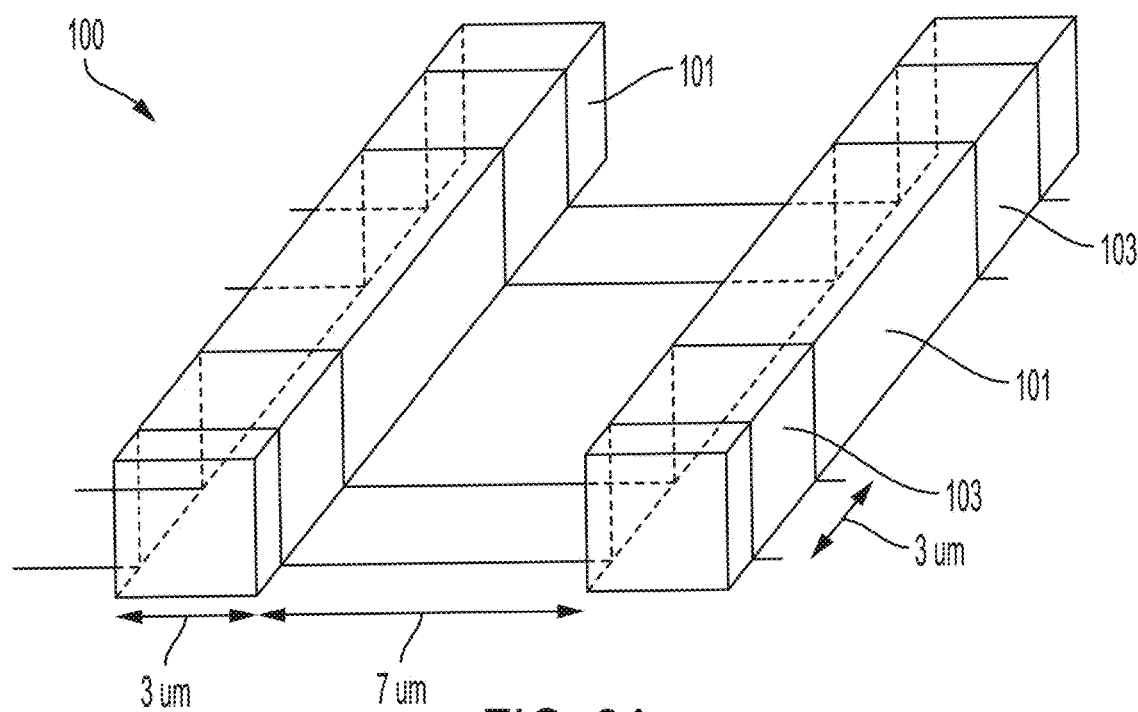
FIG. 3A shows one view of a pore-defining hard mask deposited over the first layer of membrane material in the process of making a slotted biocompatible membrane
Figure 3B:
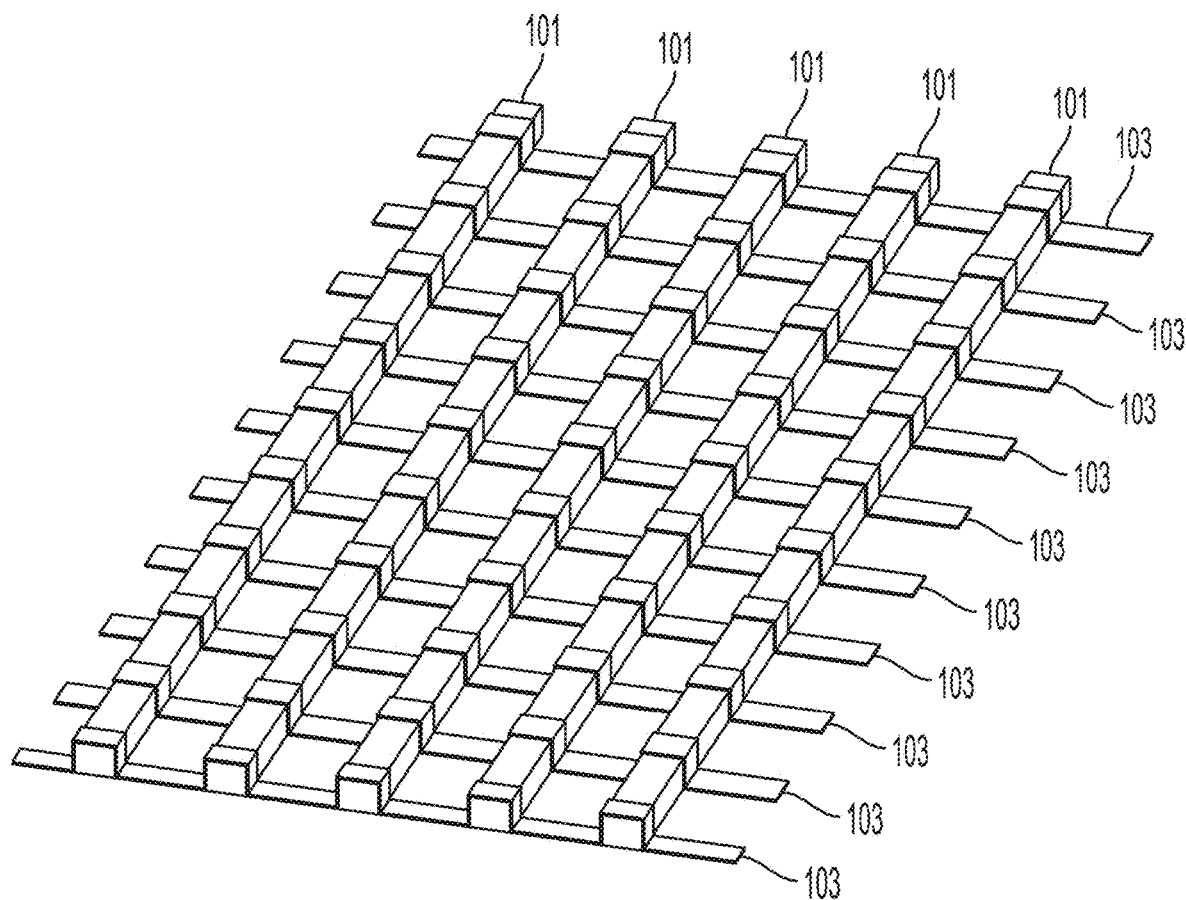
FIG. 3B shows another view of a pore-defining hard mask deposited over the first layer of membrane material in the process of making a slotted biocompatible membrane

Next, as shown in FIGS. 3A-3B, strips of pore-defining hardmask material 103 are formed over the first membrane material strips 101. The coating of pore-defining hardmask 103 in this step is "conformal" because it coats the sidewalls and upper surfaces of the worksurface, including the sidewalls and upper surfaces of the first membrane material strips 101. In the case of silicon nitride, the pore-defining hardmask layer may be deposited by chemical vapor as described above. Of course, it should be understood that a conformal coating will likely deposit thicker on horizontal surfaces than vertical surfaces, and this ratio will need to be taken into account in the membrane pore design since it is the thickness of pore-defining hardmask covering the vertical surfaces that defines the minimum pore size in membranes described herein.

The pore-defining sacrificial spacer material 102 may be any material that can be deposited, patterned, and selectively etched relative to the first membrane material 101. In one example, the hardmask material is silicon nitride. As noted above, amorphous silicon nitride may be deposited using plasma-enhanced chemical vapor deposition (PECVD). The thickness of deposited SiN films can be controlled to within +/−10 nm. This makes definition of a uniform minimum pore dimension over a large biocompatible membrane surface possible to a greater degree than previously possible. This step involves depositing a hard mask material over the substrate 100 and first membrane strips 101. Next, the same pattern/etch/strip sequence is used to pattern the hardmask layer. A photoresist is deposited over the hard mask material, patterned using photolithography, and developed to exposed strips of underlying hard mask material. The exposed strips of hardmask material is etched away to reveal portions of the first membrane material strips 101 and substrate 100. The photoresist is then stripped away exposing the hardmask strips 102.

Figure 4A:
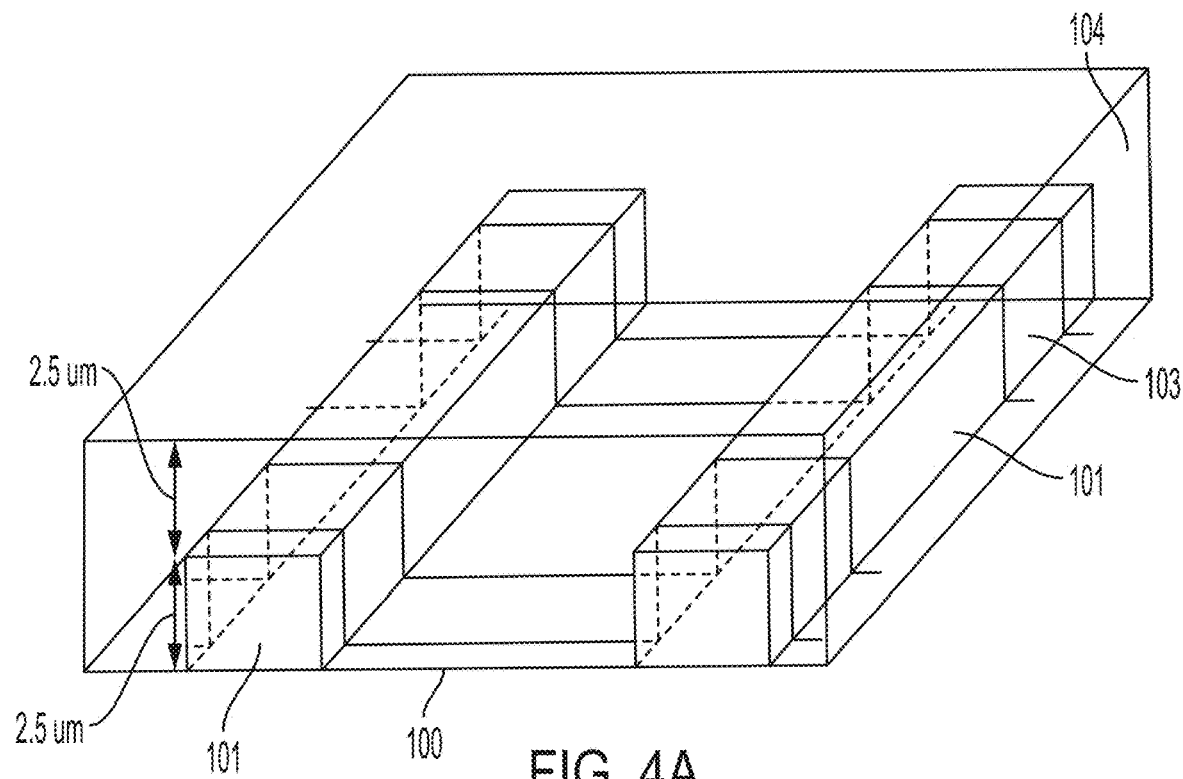
FIG. 4A shows one view of a second layer of membrane material deposited over the first layer of membrane material in the process of making a slotted biocompatible membrane.
Figure 4B:
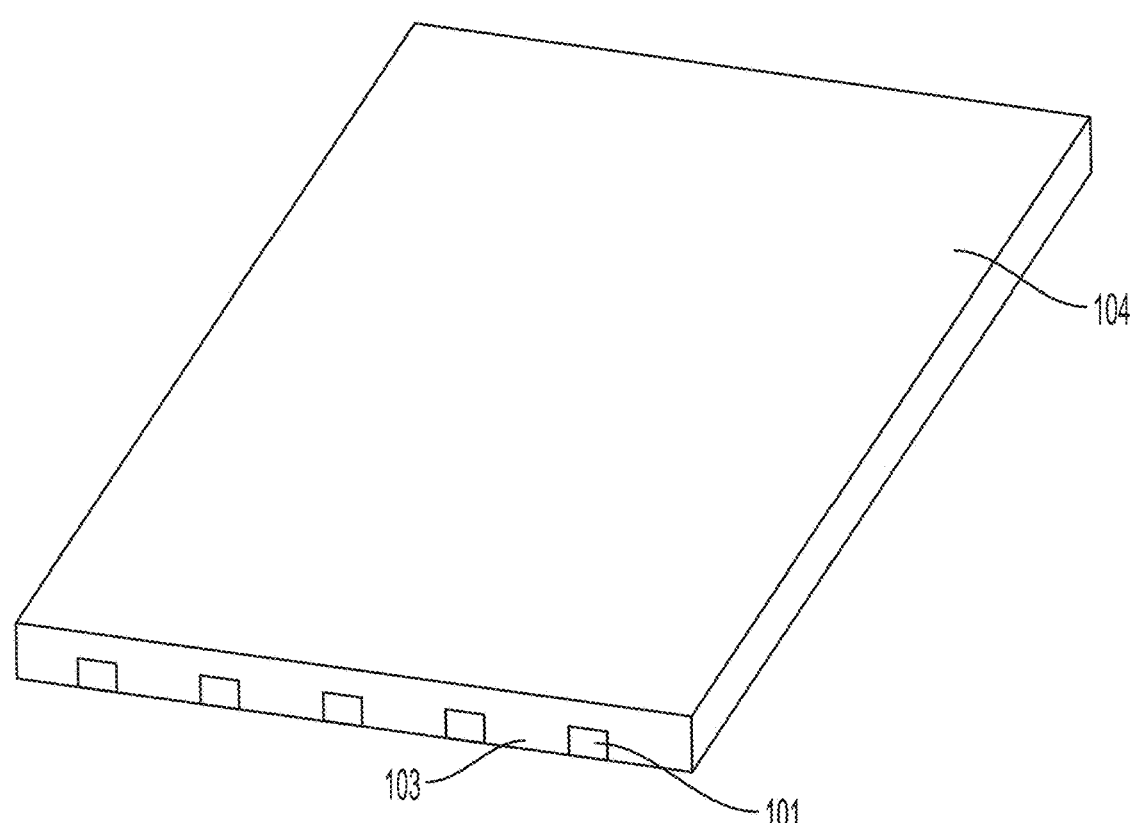
FIG. 4B shows another view of a second layer of membrane material deposited over the first layer of membrane material in the process of making a slotted biocompatible membrane.

As shown in FIG. 4A-B, a second membrane material 104 is deposited on the surface of the workpiece. This deposition is a "planarizing" deposition because it produces a flat topology on the upper surface despite the topology of the underlying worksurface. The second membrane material is desirably the same material as the first membrane material, for example, polyimide. The deposition of second membrane material may include the same coating and curing process used to deposit the first membrane material. As discussed above, the second curing process may include further curing the partially cured first membrane material. The concurrent curing or partial curing of both the first and second membrane materials at this stage may facilitate forming a stronger bond between the two materials. It may be desirable in some cases to conduct this curing step to result in the full curing of both the first and second membrane material layers. The second membrane material 104 covers the first membrane material strips 101 and patterned hard mask strips 103.

Figure 5A:
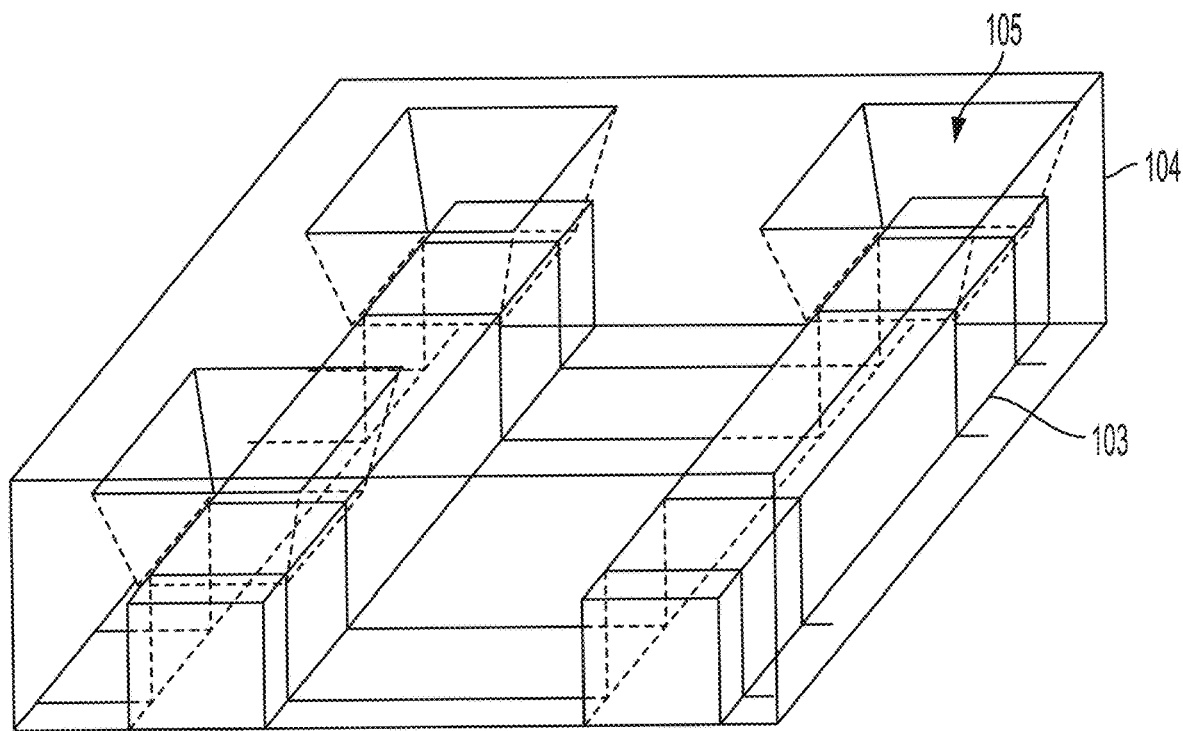
FIG. 5A shows one view of a top perspective view after etching a window in the second layer of membrane material to expose a portion of the hardmask layer in the process of making a slotted biocompatible membrane.
Figure 5B:
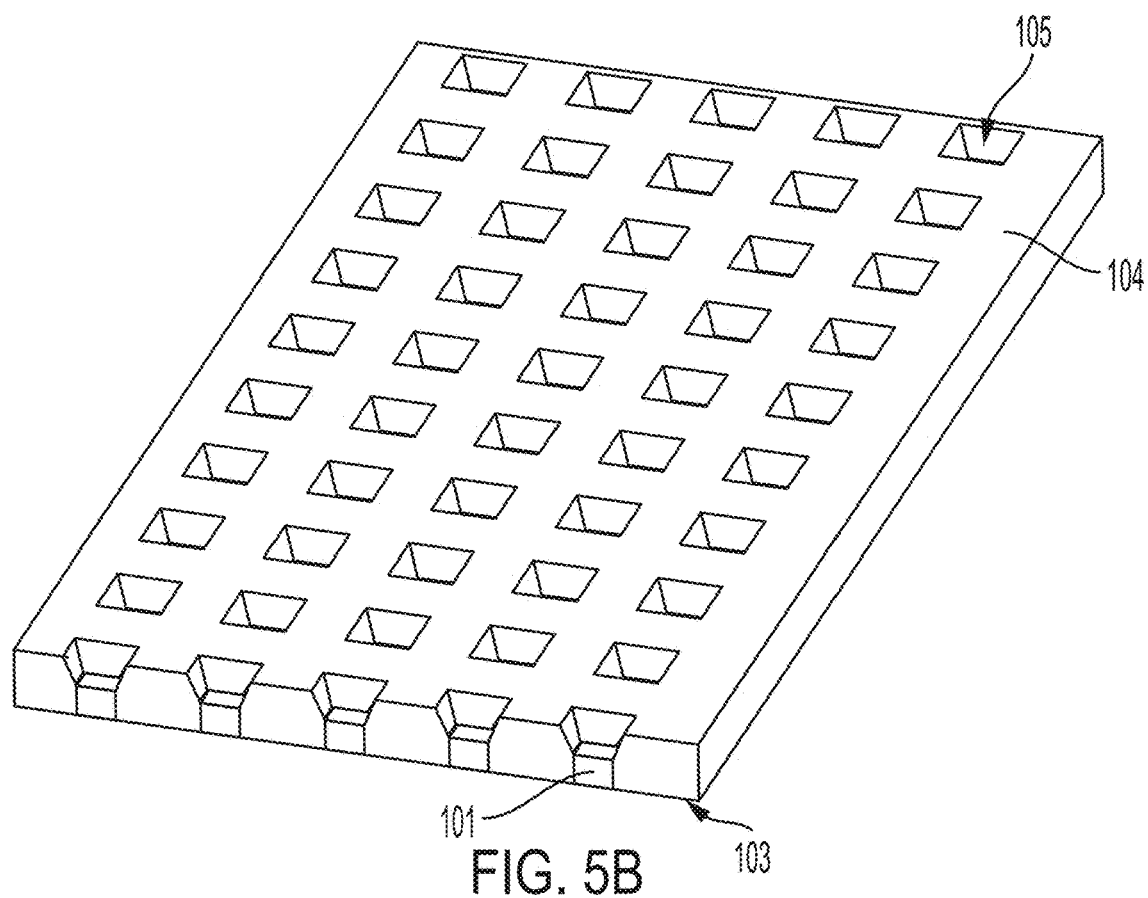
FIG. 5B shows another view of a top perspective view after etching a window in the second layer of membrane material to expose a portion of the hardmask layer in the process of making a slotted biocompatible membrane.
Figure 5C:
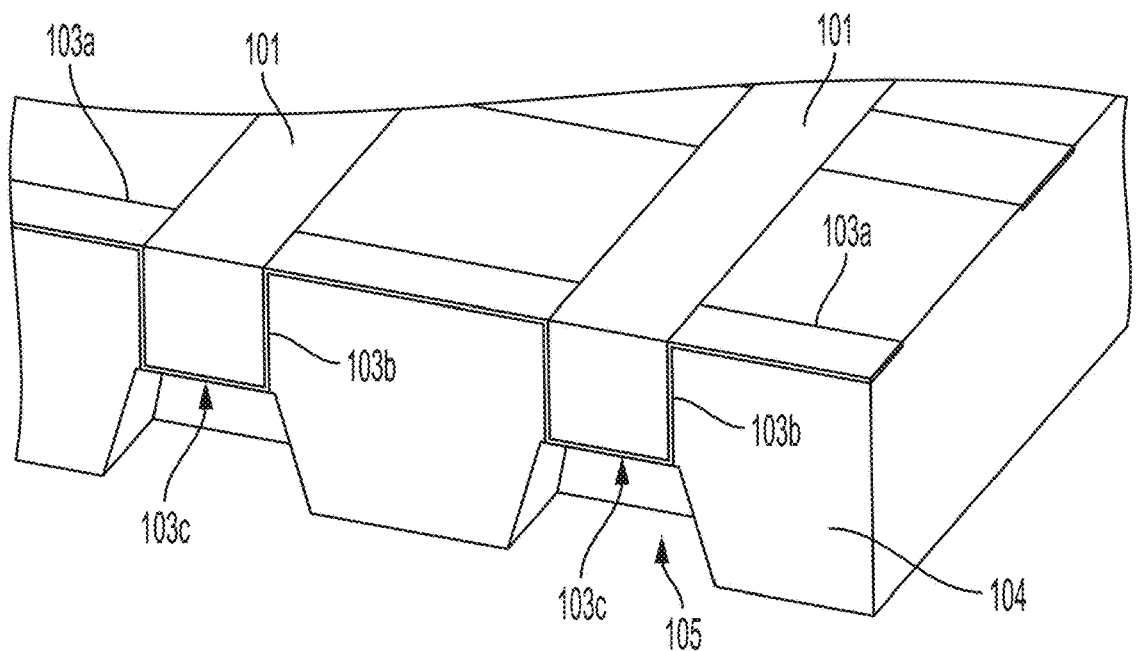
FIG. 5C shows a bottom perspective view of the of FIG. 5A-B.
Figure 5D:
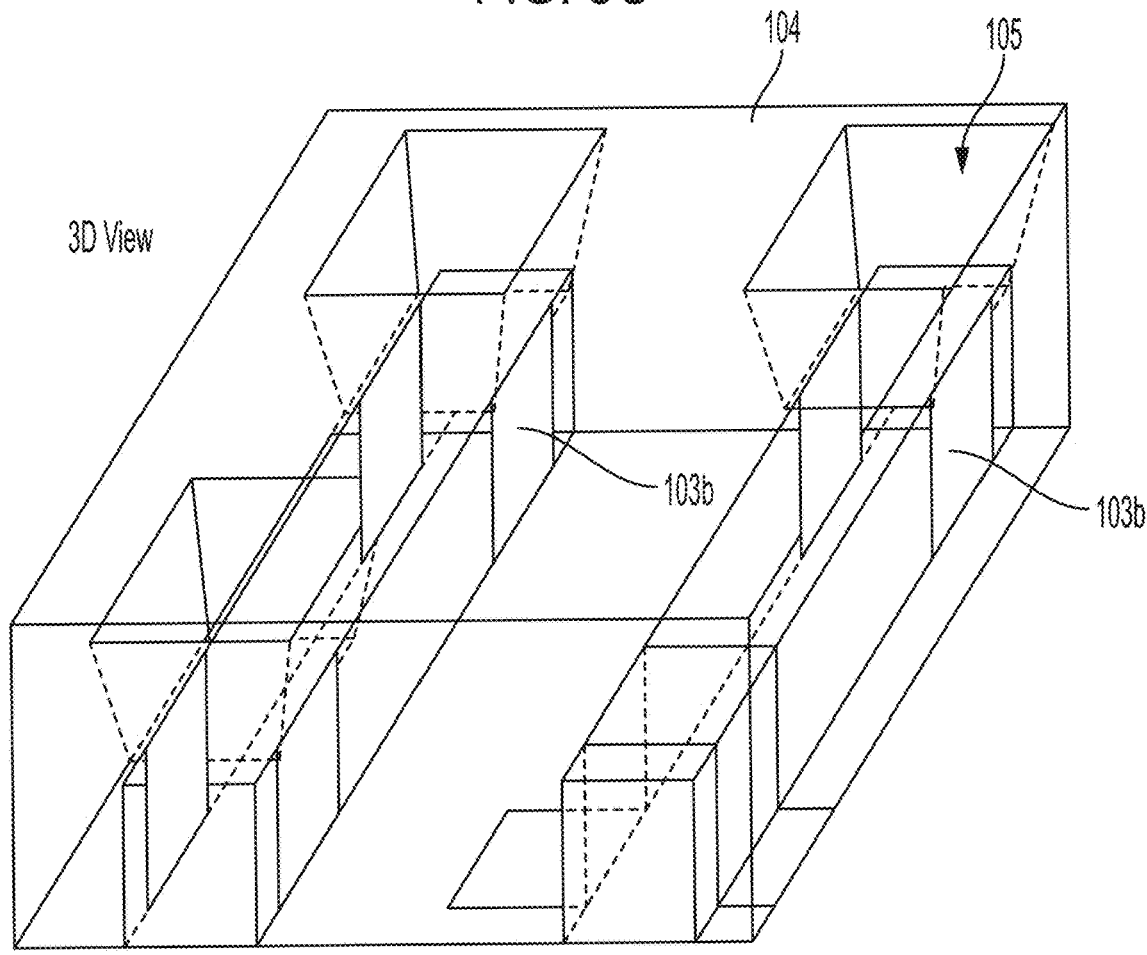
FIG. 5D shows another view of a top perspective view after etching a window in the second layer of membrane material to expose a portion of the hardmask layer in the process of making a slotted biocompatible membrane.

As shown in FIG. 5A-D, windows 105 are then patterned in the second membrane material 104 as shown in FIG. 5A. The patterning is done in the same way patterning of the first membrane material into strip using photolithography, development of the photoresist, etching and then stripping of the photoresist. The window 105 is positioned within the second membrane material 104 in a manner that exposes the portions of the hardmask layer 103*b* and 103*c* that cover the first membrane layer strips 101. Specifically, the vertical portions of the hard mask layer 103*b* that coat the sidewalls of the first membrane layer strips 101 should be exposed through the window as shown in FIG. 5C. The portions of hardmask 103*a* adjacent to the substrate 100 are not exposed as they are covered by thicker portions of the second membrane material 104. The patterning of windows uses the same pattern/etch/strip sequence described above.

If the second membrane material thickness exceeds 2 microns, a hardmask will need to be used to etch the window. The hardmask is deposited over the second membrane material layer. Photoresist is then deposited, exposed by photolithography, and developed to expose a window revealing the hardmask material. The hardmask material is then selectively etched through the photoresist layer to expose the second membrane material layer. Then, the window is etched in the second membrane material layer down to the pore-defining sacrificial spacer layer 103. The hardmask material deposited above the second membrane material layer prevents etching of the second membrane material layer outside the window.

Figure 6A:
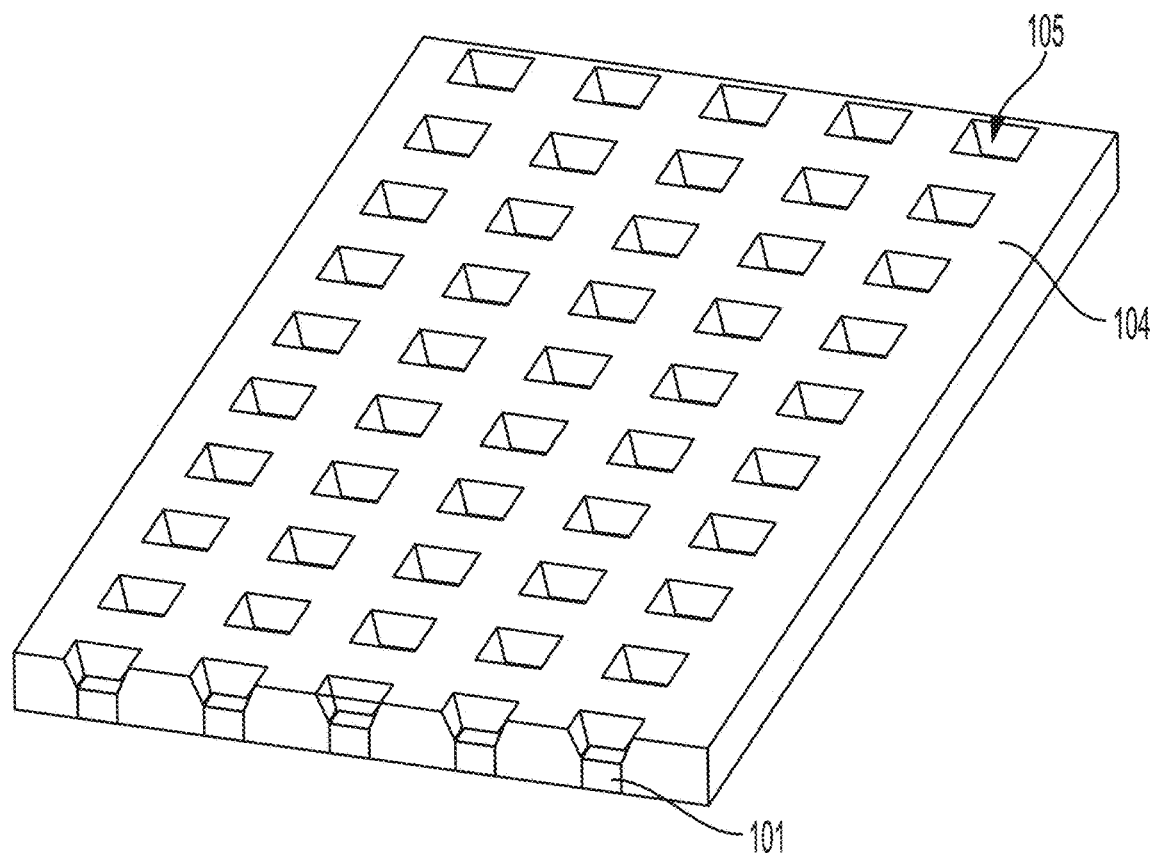
FIG. 6A shows a top perspective view after etching the hardmask material to produce a slit within the first and second membrane materials in the process of making a slotted biocompatible membrane.
Figure 6B:
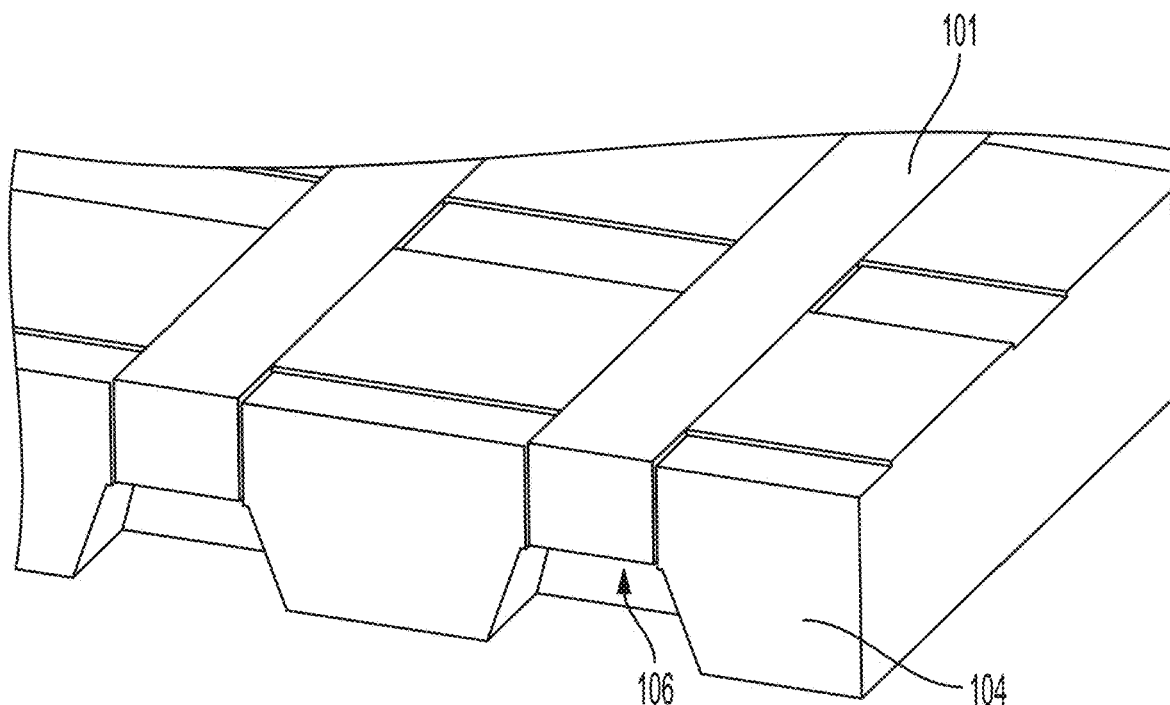
FIG. 6B shows a bottom perspective view of the of FIG. 6A.

Next the pore-defining sacrificial spacer material 103 is selectively etched relative to the first membrane material strips 101 and second membrane material layer 103 to expose vertically oriented, slot-shaped pores in the membrane as shown in FIG. 6A-6C. If a hardmask over the second membrane material layer is used, it can be removed at the same time as the pore-defining sacrificial material 103 is removed by wet etching. The slots 106 are formed from the removal of vertical portions of the pore-defining sacrificial layer 103b form the pores of the membrane material. The top down view of FIG. 6C shows slot-shaped pores 106 formed in the membrane, which includes first membrane material layer strips 101 and second membrane material layer 104.

The process may conclude with a final curing step to fully cure the first and second membrane materials. The membrane may then be removed from the substrate. In the case a release material is provided between the substrate membrane materials, the release layer may be dissolved or melted resulting in the release of the membrane from the support substrate.

Other embodiments and uses of the invention will be apparent to those skilled in the art from consideration of the specification and practice of the invention disclosed herein. All references cited herein, including all U.S. and foreign patents and patent applications, are specifically and entirely hereby incorporated herein by reference. It is intended that the specification and examples be considered exemplary only, with the true scope and spirit of the invention indicated by the following claims.

What is claimed is:

1. A biocompatible polymeric filtration membrane comprising:
    a plurality of first membrane material layer strips, wherein each first membrane material layer strip has a top surface, a side surface, and an opposite side surface;
    a second membrane material binding to each of the plurality of first membrane material layer strips, the second membrane material comprising a plurality of windows exposing each of the first membrane material layer strips, wherein a first portion of the second membrane material covers portions of the top surfaces of the plurality of first membrane material layer strips that are not exposed by the plurality of windows and a second portion of the second membrane material in regions between adjacent first membrane material layer strips;
    wherein the biocompatible polymeric filtration membrane comprises a plurality of uniform passages exposed by the plurality of windows that define pores in the biocompatible polymeric filtration membrane, the uniform passages being defined by the side surface of the plurality of first membrane material layer strips and the second portion of the second membrane material in regions between adjacent first membrane material layer strips.

2. The membrane of claim 1, wherein the plurality of first membrane material layer strips and the second membrane material comprise polyimide.

3. The membrane of claim 1, wherein the uniform passages have a thickness of 20 to 1000 nm.

4. The membrane of claim 1, having a thickness in the range of 2-10 microns.

5. The membrane of claim 1, wherein the plurality of first membrane layer strips have a thickness in the range of 1 to 5 microns.

6. The membrane of claim 1, wherein the second membrane material layer has a thickness in the range of 2.5 to 20 microns.

7. The membrane of claim 1, having a thickness of 2-10 microns, wherein the plurality of first membrane layer strips have a thickness in the range of 1 to 5 microns, and the second membrane material has a thickness in the range of 2.5 to 20 microns.

8. The membrane of claim 1, wherein each window exposes a first uniform passage and a second uniform passage.

9. The membrane of claim 8, wherein the first uniform passage is formed by the side surface of the plurality of first membrane material layer strips and the second portion of the second membrane material in regions between adjacent first membrane material layer strips.

10. The membrane of claim 9, wherein the second uniform passage is formed by the opposite side surface of the plurality of first membrane material layer strips and the second portion of the second membrane material in regions between adjacent first membrane material layer strips.

11. The membrane of claim 1, wherein the plurality of uniform passages are rectangular passages.

* * * * *